(12) United States Patent
Tsuchiya

(10) Patent No.: US 8,905,437 B2
(45) Date of Patent: Dec. 9, 2014

(54) CROSS MEMBER

(75) Inventor: Atsushi Tsuchiya, Kanagawa (JP)

(73) Assignee: Yorozu Corporation, Kanagawa (JP)

( * ) Notice: Subject to any disclaimer, the term of this patent is extended or adjusted under 35 U.S.C. 154(b) by 0 days.

(21) Appl. No.: 13/878,446

(22) PCT Filed: May 30, 2011

(86) PCT No.: PCT/JP2011/062415
§ 371 (c)(1),
(2), (4) Date: Apr. 9, 2013

(87) PCT Pub. No.: WO2012/147214
PCT Pub. Date: Nov. 1, 2012

(65) Prior Publication Data
US 2014/0145472 A1 May 29, 2014

(30) Foreign Application Priority Data

Apr. 28, 2011 (JP) ................................. 2011-101927

(51) Int. Cl.
*B62D 21/03* (2006.01)
*B62D 21/11* (2006.01)
*B62D 21/02* (2006.01)

(52) U.S. Cl.
CPC ............ *B62D 21/03* (2013.01); *B60G 2204/15* (2013.01); *B62D 21/11* (2013.01); *B62D 21/02* (2013.01)
USPC ............. 280/781; 280/124.106; 280/124.109; 296/204

(58) Field of Classification Search
CPC .... B62D 21/03; B62D 21/11; B60G 2204/15; B60G 2206/60
USPC ........... 280/124.106, 124.107, 124.109, 781; 296/29, 204
See application file for complete search history.

(56) References Cited

U.S. PATENT DOCUMENTS

| 4,909,533 | A | * | 3/1990 | Miles et al. ............ 280/124.109 |
| 7,201,398 | B1 | * | 4/2007 | Christofaro et al. .......... 280/781 |
| 7,771,137 | B2 | * | 8/2010 | Anzai et al. ................. 403/379.3 |
| 7,845,662 | B2 | * | 12/2010 | Ogawa et al. .......... 280/124.109 |
| 8,690,176 | B2 | * | 4/2014 | Perry et al. ............. 280/124.134 |
| 2010/0045072 | A1 | * | 2/2010 | Yamada et al. ................ 296/204 |
| 2014/0021746 | A1 | * | 1/2014 | Franzpotter et al. ..... 296/193.07 |

FOREIGN PATENT DOCUMENTS

| JP | 61-202907 U | 12/1986 |
| JP | 08-164758 A | 6/1996 |
| JP | 08-169359 A | 7/1996 |
| JP | 08169360 A | 7/1996 |
| JP | 2006240535 A | 9/2006 |

* cited by examiner

*Primary Examiner* — James English
(74) *Attorney, Agent, or Firm* — Drinker Biddle & Reath LLP

(57) ABSTRACT

A cross member extends in a vehicle width direction and has opening portions at end portions in the vehicle width direction. The cross member includes a cross member main body, a closing plate, and a cylindrical spacer. The end portion of the cross member main body in the vehicle width direction includes a recessed portion on a side of the cross member main body opposite to a side on which the cross member main body is opened, the recessed portion being recessed toward the inner surface side.

4 Claims, 8 Drawing Sheets

CROSS MEMBER

PRIORITY

Priority is claimed as a national stage application, under 35 U.S.C. §371, to PCT/JP2011/062415, May 30, 2011, which claims priority to Japanese Application No. 2011-101927, filed Apr. 28, 2011. Each disclosure of the aforementioned priority applications is incorporated herein by reference in its entirety.

TECHNICAL FIELD

The present invention relates to cross members for vehicles.

BACKGROUND ART

Sub-frames attached to the suspension of a vehicle generally include side members extending along the front-rear direction of the vehicle body and a cross member extending along the vehicle width direction. The cross member may be linked to the side members or a vehicle body frame including the axle at the ends of the cross member in the vehicle width direction.

The cross member is subjected to forces in front-rear, left-right, and up-down directions. Thus, the cross member needs to have sufficient rigidity to resist such forces and their moments, and the cross member needs to be lightweight.

A cross member having a hollow internal structure for providing sufficient rigidity at a lightweight is known (see Patent document 1, for example).

PRIOR ART DOCUMENT

Patent Literature

Patent literature 1: Japanese Patent Application Laid-Open No. 2006-240535

Technical Problem

However, the cross member according to JP-A-2006-240535 includes opening portions at both ends in the vehicle width direction, and rocks may easily fly into an internal space of the cross member through the opening portions.

SUMMARY OF INVENTION

In view of the foregoing problem of the related art, it is an object of the present invention to provide a cross member capable of preventing the entry of rocks via the opening portions of both ends.

Solution to Problem

In order to achieve the above object of the present invention, a cross member includes an opening portion formed at an end portion of the cross member extending along a vehicle width direction of a vehicle. The cross member also includes a cross member main body having an inner surface opened in one direction in a cross section perpendicular to the vehicle width direction at the end portion in the vehicle width direction, a closing plate joined to the cross member main body and located to close the inner surface of the cross member main body. The cross member also includes a cylindrical spacer disposed in an internal space formed by the cross member main body and the closing plate at the end portion of the cross member main body in the vehicle width direction, and joined to the cross member main body in such a manner as to form a through-hole in a direction perpendicular to the vehicle width direction and to the direction in which the cross member main body is opened. The end portion of the cross member main body in the vehicle width direction includes a recessed portion formed on a side of the cross member main body opposite to a side on which the cross member main body is opened, the recessed portion being recessed toward the inner surface side.

Advantageous Effects of Invention

The cross member according to the invention provides sufficient rigidity at a light weight because of the hollow structure including the cross member main body and the closing plate. The opening area of the opening portion is decreased by the recessed portion, which is formed at the end portion of the cross member main body in the vehicle width direction and recessed toward the inner surface side, so that the entry of flying rocks via the opening portion can be prevented.

Further, because the recessed portion is formed at the end portion of the cross member main body, where the opening portion is formed, the hollow member including the cross member main body and the closing plate has a decreased rigidity in a direction perpendicular to the vehicle width direction and the direction in which the cross member main body is opened. Thus, when a vehicle body frame is linked to the cylindrical spacer, the rigidity of the hollow member including the cross member main body and the closing plate is reduced, so that the cylindrical spacer can be linked to the vehicle body frame with an appropriate axial force. Accordingly, the cross member has high fastening efficiency with regard to the linking portion and provides an anti-loosening structure against external force.

By touching the recessed portion of the cross member main body on the outer peripheral surface of the cylindrical spacer, the cylindrical spacer can be easily positioned with respect to the cross member main body. Thus, the step of joining (welding) the cylindrical spacer to the cross member main body can be simplified, thereby enabling the cross member to be manufactured in less time and at lower cost.

By touching the closing plate on the outer peripheral surface of the cylindrical spacer and touching the cross member main body on the cylindrical spacer, the cylindrical spacer can be easily positioned with respect to the cross member main body. Thus, the step of joining (welding) the cylindrical spacer to the cross member main body can be simplified, so that the cross member can be manufactured in less time and at lower cost.

By touching the closing plate on the protruding portion formed on the inner surface of the cross member main body, the closing plate can be easily positioned with respect to the cross member main body, so that the step of joining (welding) the closing plate to the cross member main body can be simplified, thereby enabling the cross member to be manufactured in less time and at lower cost.

DESCRIPTION OF EMBODIMENTS

Figure 1:
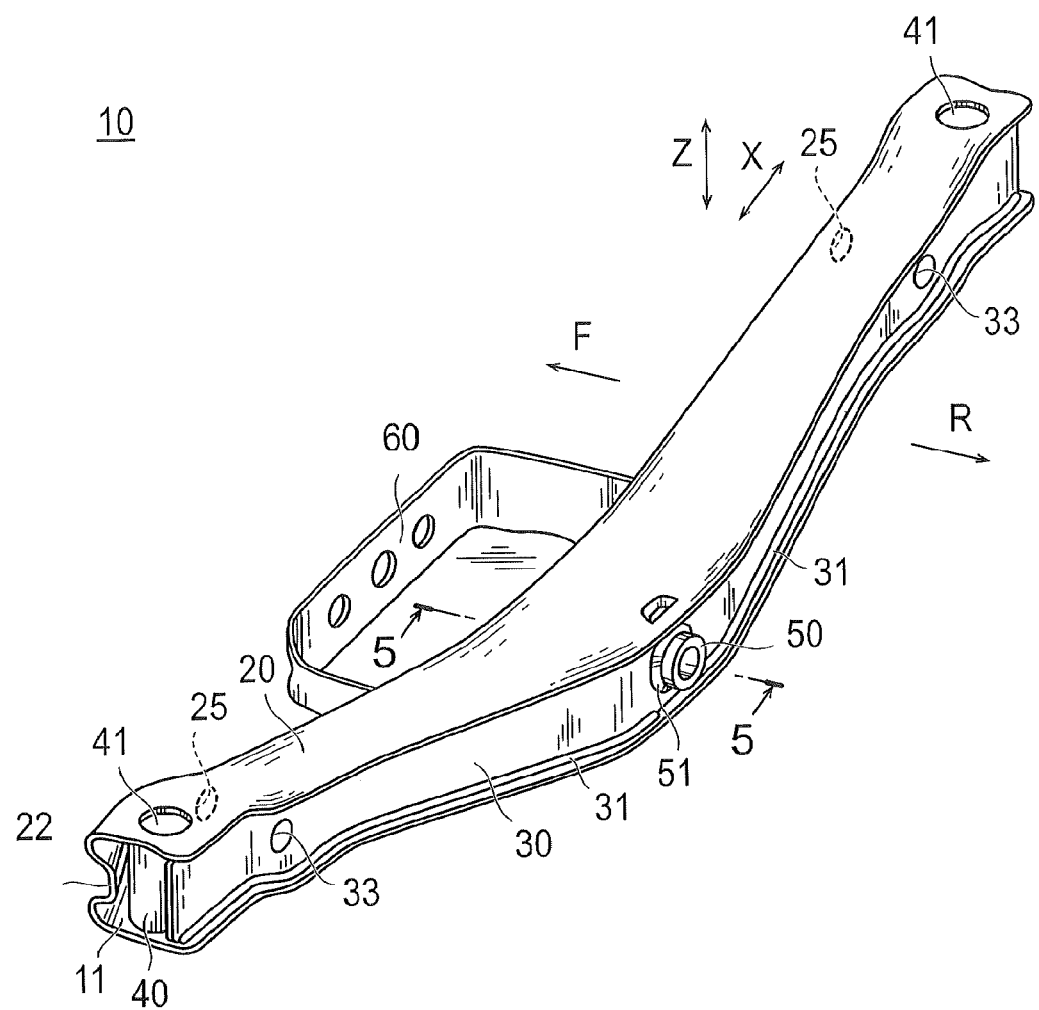
FIG. 1 is an oblique perspective view of a cross member according to an embodiment.
Figure 2:
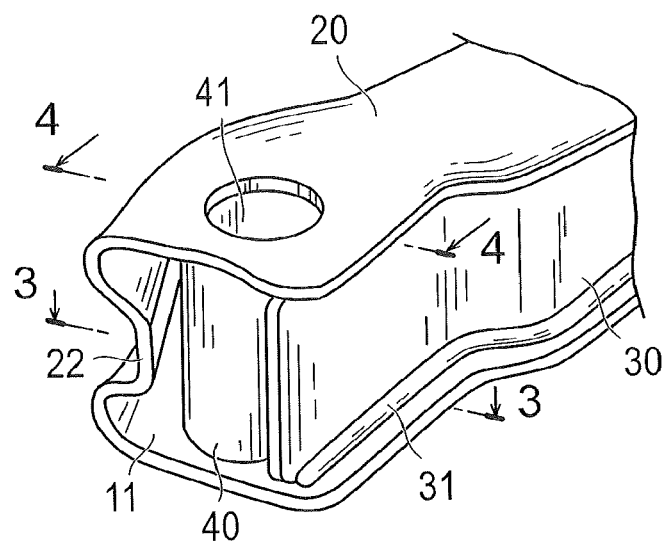
FIG. 2 is an oblique perspective view illustrating an end portion of the cross member according to the embodiment.
Figure 3:
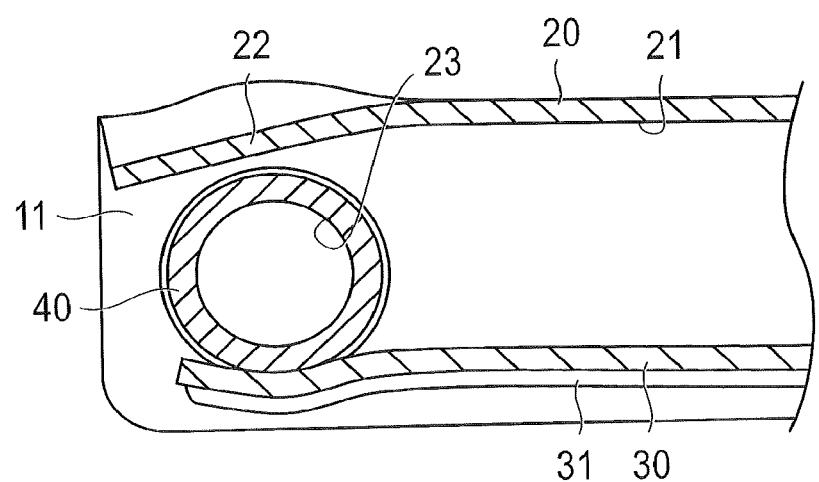
FIG. 3 is a cross section view taken along line 3-3 of FIG. 2.
Figure 4:
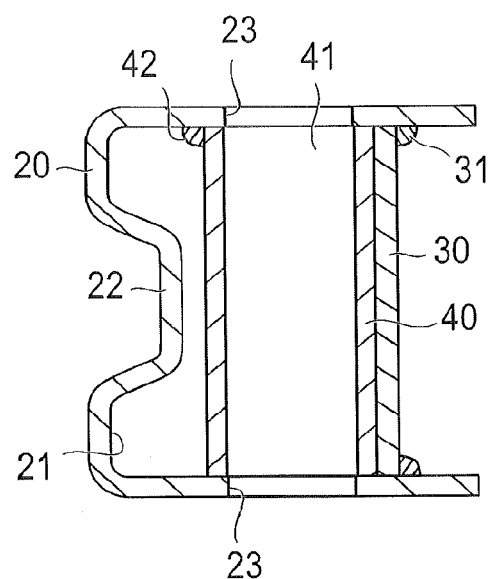
FIG. 4 is a cross section view taken along line 4-4 of FIG. 2.
Figure 5:
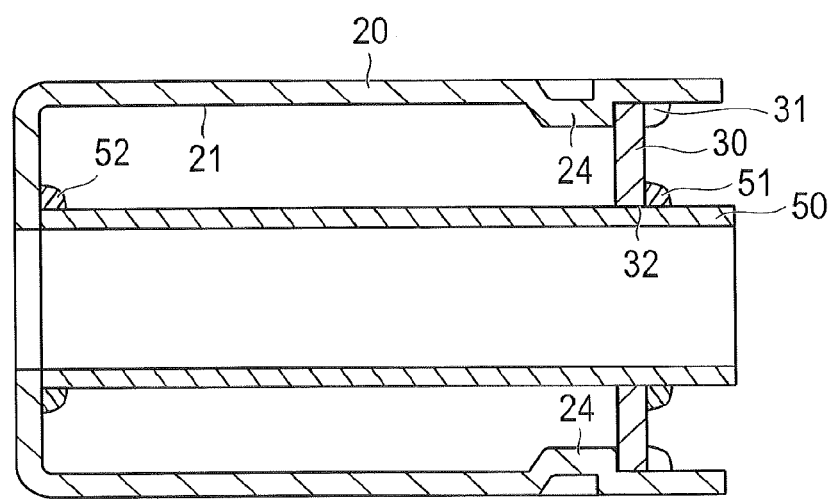
FIG. 5 is a cross section view taken along line 5-5 of FIG. 1.

In the following, an embodiment of the present invention will be described with reference to the drawings. The dimensional ratios in the drawings may be exaggerated for illustrative purposes and may differ from the actual ratios.

As illustrated in FIGS. 1 through 5, a cross member 10 according to the embodiment of the present invention is a hollow member extending along a vehicle width direction X and including opening portions 11 at the end portions in the vehicle width direction X. The cross member 10 includes a cross member main body 20, a closing plate 30, cylindrical spacers 40, a linking member 50, and a bracket 60.

The cross member main body 20 includes an inner surface having a substantially U-shaped cross section perpendicular to the vehicle width direction X, the opening of the U facing a rear direction R of the vehicle and extending throughout the length of the cross member main body 20 along the vehicle width direction X. The cross member main body 20 further includes recessed portions 22 formed at both ends in the vehicle width direction X. The recessed portions 22 are provided on a side facing a front direction F opposite to the rear direction R in which the inner surface 21 is opened, and are recessed toward the inner surface side. The recessed portions 22 are tapered with increasing depth toward the ends along the vehicle width direction X. The direction in which the cross member main body 20 is opened is not limited to the rear direction R but may include the front direction F.

At the end portions of the cross member main body 20 in the vehicle width direction X, holes 23 are formed in both sides in an up-down direction Z perpendicular to both the vehicle width direction X and the opening direction (rear direction R), into which holes 23 the cylindrical spacers 40 are inserted. At a substantially central portion of the cross member main body 20 in the vehicle width direction X, protruding portions 24 are formed. The protruding portions 24 protrude on the inner surface 21 from both sides of the cross member main body 20 in the up-down direction Z such that the closing plate 30 can be touched on the protruding portions 24 (see FIG. 5).

In the surface of the cross member main body 20 facing the front direction F and at positions closer to the center than the end portions in the vehicle width direction X, locating holes 25 for positioning the cross member main body 20 are formed when joining the closing plate 30 to the cross member main body 20.

The cylindrical spacers 40 include a cylindrical member linked to the vehicle body frame 100 via a bolt 101 (see FIG. 6) and including a through-hole 41 extending along the up-down direction Z. The cylindrical spacers 40 are disposed within the cross member main body 20 with the through-holes 41 communicated with the holes 23 in the sides in the up-down direction Z. The cylindrical spacers 40 are welded onto the cross member main body 20 at one or both ends of the cylindrical spacers 40, thus forming a spacer weld portion 42 (see FIG. 4).

The closing plate 30 includes a plate member extending along the vehicle width direction X. The closing plate 30 is disposed between the both sides of the cross member main body 20 in the up-down direction Z so as to close the inner surface 21 of the cross member main body 20, with the edge portions welded onto the cross member main body 20. At the edge portions, the closing plate 30 meets the cross member main body 20, thus forming closing plate weld portions 31. At positions closer to the center of the closing plate 30 than the end portions thereof in the vehicle width direction X, locating holes 33 for positioning the closing plate 30 are formed when joining the closing plate 30 to the cross member main body 20. At substantially a central portion of the closing plate 30 in the vehicle width direction X, a hole 32 is formed, through which the cylindrical linking member 50 is passed and welded therein, thus forming a first linking member weld portion 51 (see FIG. 5). The linking member 50 is also linked to the cross member main body 20 via a second linking member weld portion 52. Via the linking member 50 and the bracket 60, a Watt's linkage (not illustrated) connected to lateral links (not illustrated) may be linked.

The substantially central portion of the closing plate 30 in the vehicle width direction X is touched on the protruding portions 24 of the cross member main body 20, while the end portions of the closing plate 30 are touched on outer peripheral surfaces of the cylindrical spacers 40, such that the closing plate 30 can be positioned with respect to the cross member main body 20.

The bracket 60, which is a member that can be linked to the Watt's linkage, is joined to the surface facing the front direction F of the cross member main body 20 by welding.

The cross member main body 20 and the closing plate 30 may be obtained by forming a thin flat plate material (having a thickness t of 1.4 mm to 1.8 mm, for example).

Next, steps for manufacturing the cross member 10 according to the present embodiment will be described.

Figure 7:
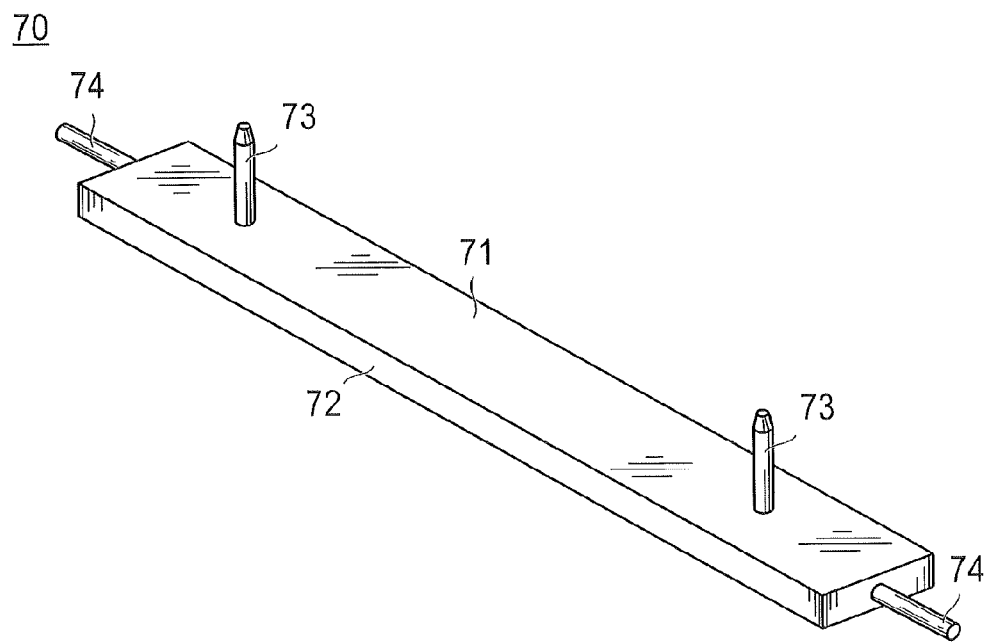
FIG. 7 is an oblique perspective view of a jig used for manufacturing the cross member according to the embodiment.

When the cross member 10 is manufactured, a jig 70 illustrated in FIG. 7 is used. The jig 70 includes a flat mounting plate 72 with a mounting surface 71 for mounting the cross member main body 20 formed thereon; two locating pins 73 protruding from the mounting surface 71 of the mounting plate 72; and a rotating shaft 74 enabling the mounting plate 72 to be rotated.

The locating pins 73 can be inserted into the locating holes 25 of the cross member main body 20 and the locating holes 33 of the closing plate 30.

The rotating shaft 74 may be pivotally mounted on fixed bearings (not illustrated) such that the posture of a member placed on the mounting plate 72 can be freely changed. Preferably, a fixing means (not illustrated) for fixing the mounting plate 72 at an arbitrary rotational position may be provided.

When the cross member 10 is manufactured, first the cross member main body 20 and the closing plate 30 are formed from a flat-plate material. To the cross member main body 20, the linking member 50 and the cylindrical spacers 40 may be provisionally welded at one or two locations during the forming process.

Figure 8:
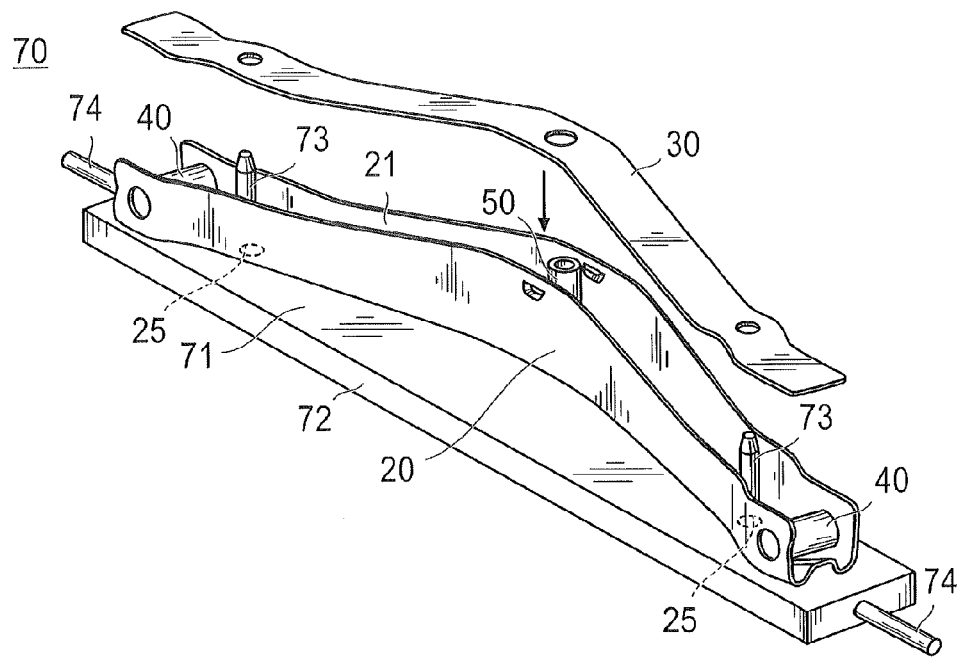
FIG. 8 is a first perspective view illustrating a process of manufacturing the cross member according to the embodiment by using the jig.

Then, the mounting plate 72 is fixed in place with the mounting surface 71 facing upward as illustrated in FIG. 8, and the cross member main body 20 is placed on the mounting plate 72 with the opening of the inner surface 21 facing upward. At this time, the locating pins 73 are inserted into the locating holes 25 of the cross member main body 20 so as to position the cross member main body 20 with respect to the mounting plate 72. In this state, the linking member 50 provisionally welded to the cross member main body 20 may be permanently welded, thereby forming the second linking member weld portion 52 (see FIG. 5). Further, the cylindrical spacers 40 provisionally welded to the cross member main body 20 may be permanently welded, thus forming the spacer weld portion 42 (see FIG. 4).

Figure 9:
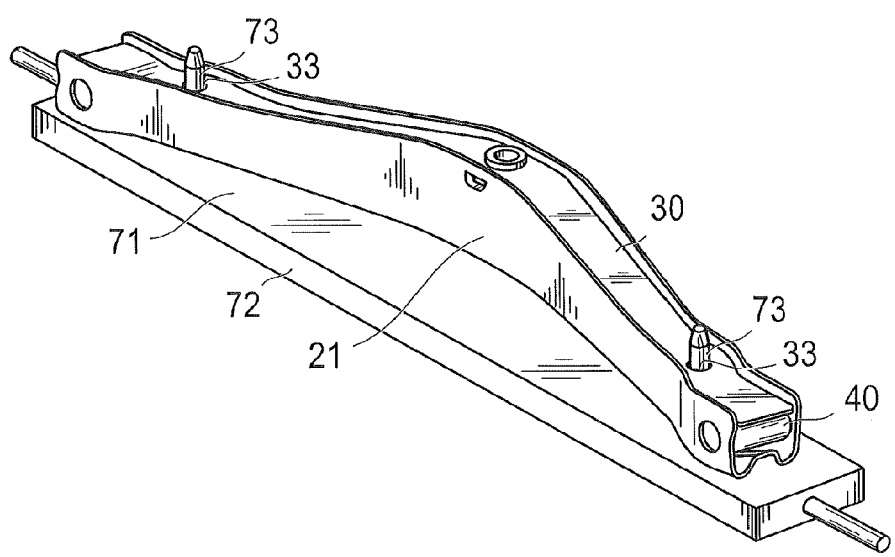
FIG. 9 is a second perspective view illustrating the process of manufacturing the cross member according to the embodiment by using the jig.

Then, the closing plate 30 is fitted on the open inner surface 21 of the cross member main body 20, as illustrated in FIG. 9, while the locating pins 73 are inserted into the locating holes 33 of the closing plate 30. At this time, the substantially central portion of the closing plate 30 in the vehicle width direction X is touched on the protruding portions 24 of the cross member main body 20 (see FIG. 5). Further, the end portions of the closing plate 30 are touched on the outer peripheral surfaces of the cylindrical spacers 40 (see FIG. 4). Thus, the closing plate 30 can be easily and accurately positioned with respect to the cross member main body 20.

Figure 10:
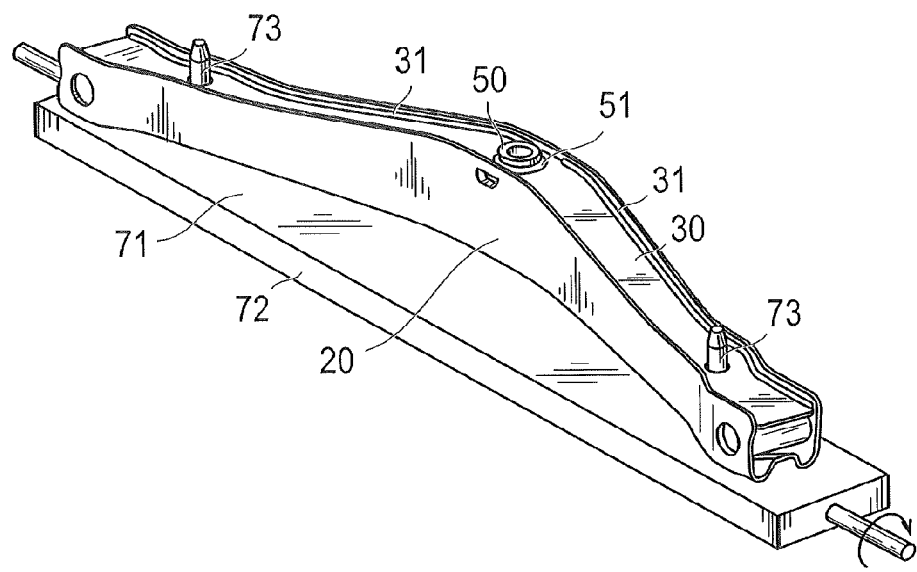
FIG. 10 is a third perspective view illustrating the process of manufacturing the cross member according to the embodiment by using the jig.

Then, the closing plate 30 is welded onto the cross member main body 20, thereby forming a closing plate weld portion 31 as illustrated in FIG. 10. Further, the linking member 50 is welded onto the closing plate 30, thus forming the first linking member weld portion 51.

Thereafter, the posture of the placed member, such as the cross member main body 20, may be changed as desired by rotating the mounting plate 72 so that the bracket 60 can be welded to the cross member main body 20, thus completing the manufacture of the cross member 10.

According to the present embodiment, the cross member 10 having a lightweight and sufficient rigidity can be manufactured easily and at low cost by adopting the hollow structure formed by welding the closing plate 30 to the cross member main body 20 having a substantially U-shaped cross section with the opening of the U facing one direction. Further, the recessed portions 22 and the cylindrical spacers 40 provided at the end portions of the cross member 10 decrease the opening area of the opening portions 11 and thereby prevent the entry of flying rocks into the cross member 10.

Because of the protruding portions 24 formed on the inner surface 21 of the cross member main body 20, the closing plate 30 can be easily positioned with respect to the cross member main body 20, so that the welding step can be simplified and the cross member 10 can be manufactured in less time and at lower cost. Furthermore, because the closing plate 30 is touched on the outer peripheral surfaces of the cylindrical spacers 40 fixed to the cross member main body 20, the closing plate 30 can be positioned easily with respect to the cross member main body 20. Thus, the step of welding the closing plate 30 to the cross member main body 20 can be simplified, so that the cross member 10 can be manufactured in less time and at lower cost.

Because the cross member main body 20 has the substantially U-shaped cross section with the opening facing one direction, the cylindrical spacers 40, the linking member 50, and the closing plate 30 can be joined to the cross member main body 20 while the cross member main body 20 is fixed in a certain posture on the jig 70. Thus, the cross member 10 can be manufactured in less time and at lower cost.

The posture of the member placed on the jig 70 can be readily changed by rotating the jig 70, allowing the bracket 60 to be easily joined to the cross member main body 20.

Figure 6:
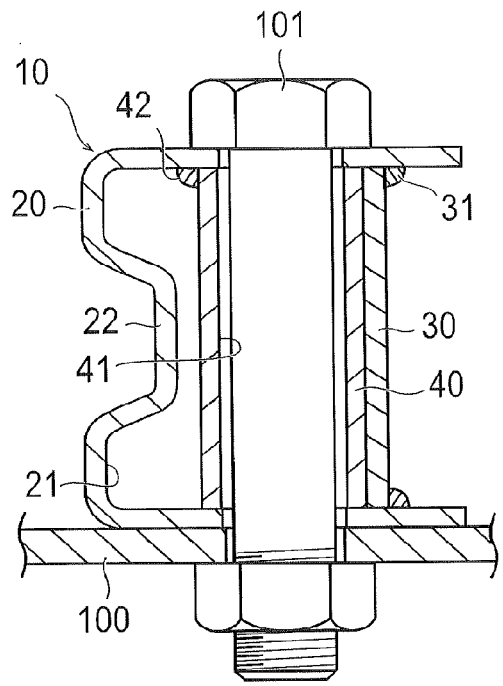
FIG. 6 is a cross section view of the cross member linked to the vehicle body frame via a cylindrical spacer.

Because of the opening portions 11 and the recessed portions 22 formed at the ends of the cross member 10, the hollow member including the cross member main body 20 and the closing plate 30 have a decreased rigidity in the up-down direction Z. Thus, when the vehicle body frame 100 is linked to the cylindrical spacers 40 as illustrated in FIG. 6, the rigidity of the hollow member including the cross member main body 20 and the closing plate 30 is decreased, so that the cylindrical spacers 40 can be linked to the vehicle body frame 100 with an appropriate axial force. Accordingly, the linking portions have high fastening efficiency and provide a structure that is hard to loosen against external force.

The present invention is not limited to the foregoing embodiment, and various modifications may occur to those skilled in the art within the technical idea of the present invention. For example, the cross member according to the present embodiment may be applied for purposes other than the cross member for suspensions. While the cross member main body 20 has a substantially U-shaped cross section throughout the length in the vehicle width direction X, the cross member main body 20 may have the substantially U-shape cross section only at the end portions in the vehicle width direction X. The cross member main body 20 may have a cross-sectional shape other than U-shape as long as the inner surface 21 is opened in one direction.

Figure 11:
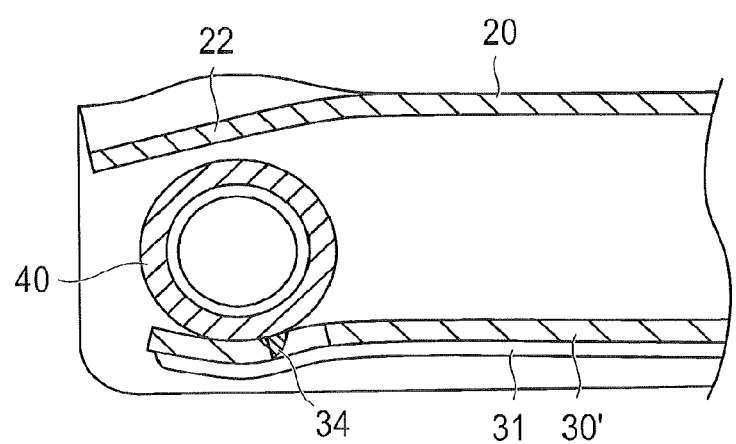
FIG. 11 is a cross section view of the cross member according to a modification of the embodiment.

In a modification of the cross member illustrated in FIG. 11, a closing plate 30' may be welded to the cylindrical spacers 40, thus forming a second spacer weld portion 34.

Figure 12:
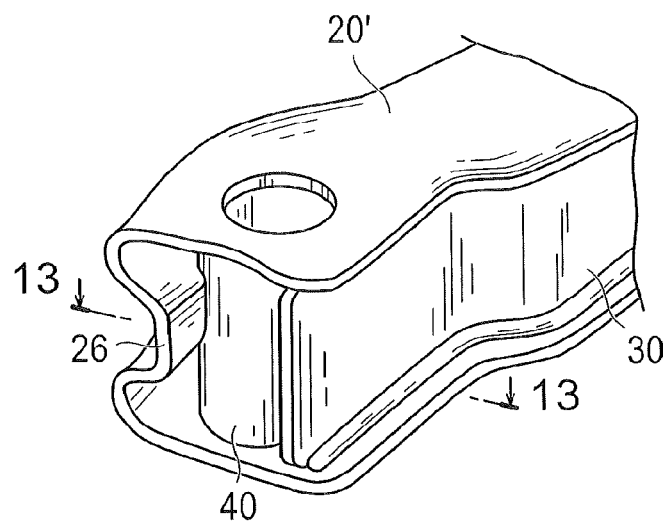
FIG. 12 is an oblique perspective view of the cross member according to another modification of the embodiment.
Figure 13:
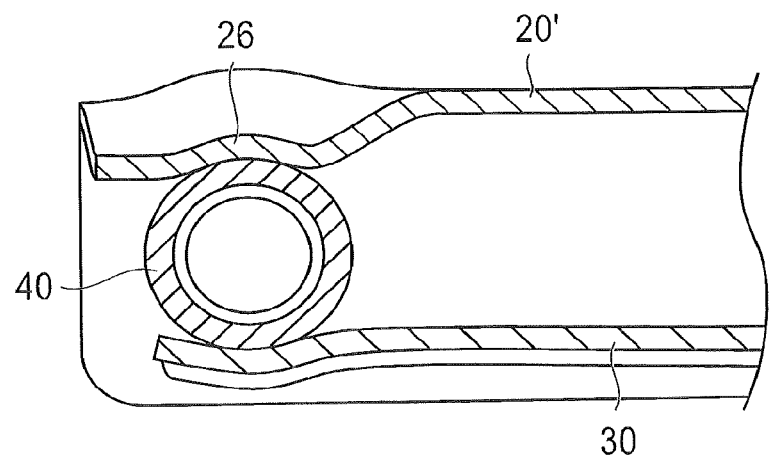
FIG. 13 is a cross section view taken along line 13-13 of FIG. 12.

In another modification of the cross member illustrated in FIGS. 12 and 13, a cross member main body 20' may include a recessed portion 26 touching on the outer peripheral surface of the cylindrical spacers 40. In this case, the recessed portion 26 may have a curvature along the shape of the outer peripheral surface of the cylindrical spacers 40. In this way, the cylindrical spacers 40 can be easily positioned by simply touching the cylindrical spacers 40 on the cross member main body 20'. Thus, the step of welding the cylindrical spacers 40 to the cross member main body 20' can be simplified, so that the cross member can be manufactured in less time and at lower cost.

Figure 14:
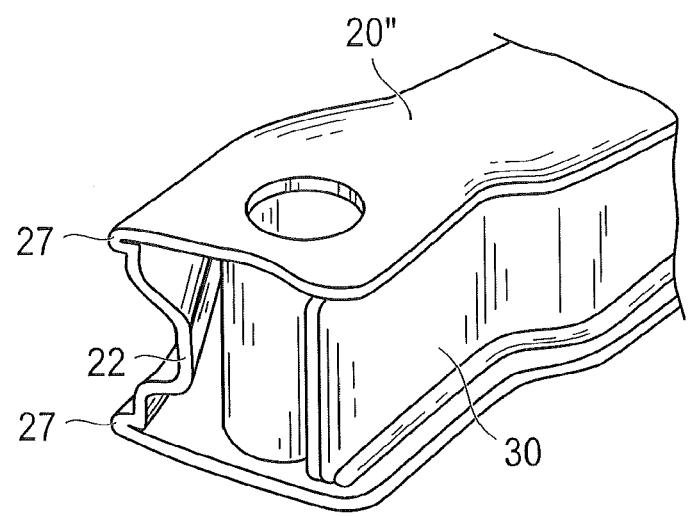
FIG. 14 is an oblique perspective view of the cross member according to a further modification of the embodiment.

In another modification of the cross member illustrated in FIG. 14, a cross member main body 20' may include a folded portion 27 which is formed by folding the plate member at an edge extending along the vehicle width direction X. In this way, the rigidity of the cross member maybe increased.

Industrial Applicability

The present invention may be suitably applied for a suspension cross member for vehicle suspensions.

REFERENCE SIGNS LIST

10 Cross member
11 Opening portion
20, 20', 20" Cross member main body
21 Inner surface
22, 26 Recessed portion
24 Protruding portion 26 Recessed portion
30, 30' Closing plate
40 Cylindrical spacer
41 Through-hole
50 Linking member
60 Bracket
70 Jig
100 Vehicle body frame
F Front direction
R Rear direction (Opening direction)
X Vehicle width direction
Z Up-down direction

The invention claimed is:

1. A cross member extending in a vehicle width direction and having opening portions at end portions in the vehicle width direction, comprising:
   a cross member main body having an inner surface opened in one direction in a cross section perpendicular to the vehicle width direction at the end portion in the vehicle width direction;
   a closing plate joined to the cross member main body in such a manner as to close the inner surface of the cross member main body; and
   a cylindrical spacer disposed in an internal space formed by the cross member main body and the closing plate at the end portion of the cross member main body in the vehicle width direction, and joined to the cross member main body in such a manner as to form a through-hole in a direction perpendicular to the vehicle width direction and to the direction in which the cross member main body is opened,
   wherein the end portion of the cross member main body in the vehicle width direction includes a recessed portion formed on a side of the cross member main body opposite to a side on which the cross member main body is opened, the recessed portion being recessed toward an inner surface side.

2. The cross member according to claim 1, wherein the recessed portion of the cross member main body is touched on an outer peripheral surface of the cylindrical spacer.

3. The cross member according to claim 1, wherein the closing plate is touched on an outer peripheral surface of the cylindrical spacer.

4. The cross member according to claim 1, further comprising a protruding portion formed on the inner surface of the cross member main body, wherein the closing plate is touched on the protruding portion.

* * * * *